US005158700A

United States Patent [19]

Sotoya et al.

[11] Patent Number: 5,158,700

[45] Date of Patent: Oct. 27, 1992

[54] BLEACHING COMPOSITION

[75] Inventors: Kohshiro Sotoya, Wakayama; Muneo Aoyagi, Tochigi; Nobuyuki Ogura; Youhei Kaneko, both of Wakayama, all of Japan

[73] Assignee: Kao Corporation, Tokyo, Japan

[21] Appl. No.: 533,354

[22] Filed: Jun. 5, 1990

[30] Foreign Application Priority Data

Jun. 14, 1989 [JP] Japan ................................ 1-150758

[51] Int. Cl.[5] ................................................ C09K 3/00

[52] U.S. Cl. ................................ 252/186.38; 252/95

[58] Field of Search ........................ 252/186.38, 186.39

[56] References Cited

U.S. PATENT DOCUMENTS

| | | | |
|---|---|---|---|
| 4,367,156 | 1/1983 | Diehl | 252/186.38 |
| 4,397,757 | 8/1983 | Bright et al. | 252/186.41 X |
| 4,818,426 | 4/1989 | Humphreys et al. | 252/99 X |
| 4,904,406 | 2/1990 | Darwent et al. | 252/186.38 |
| 4,915,863 | 4/1990 | Aoyagi et al. | 252/186.38 |
| 4,933,103 | 6/1990 | Aoyagi et al. | 252/186.38 |
| 4,988,451 | 1/1991 | Nunn et al. | 252/186.38 |

FOREIGN PATENT DOCUMENTS

| | | | |
|---|---|---|---|
| 0170386 | 2/1986 | European Pat. Off. | 252/186.38 |
| 0284132 | 9/1988 | European Pat. Off. . | |
| 0284292 | 9/1988 | European Pat. Off. . | |

OTHER PUBLICATIONS

European Search Report.

*Primary Examiner*—Richard D. Lovering
*Assistant Examiner*—Joseph D. Anthony
*Attorney, Agent, or Firm*—Birch, Stewart, Kolasch & Birch

[57] ABSTRACT

A bleaching composition comprises (a) hydrogen or a peroxide to produce hydrogen peroxide in its aqueous solution and (b) an organic peracid precusor having the formula (I) in which a quaternary ammonium is connected with an alkyl through an ether, an amide or an ester.

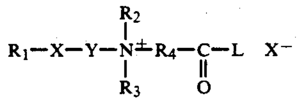

(I)

7 Claims, No Drawings

BLEACHING COMPOSITION

FIELD OF INDUSTRIAL APPLICATION

The present invention relates to a bleaching agent and bleach-detergent composition which contain a bleach-activating agent having a cationic group.

PRIOR ART

Chlorine bleaching agents have the disadvantage of being limited in the types of fibers to which they can be applied. That is, they cannot be applied to dyed and patterned cloths. Moreover, they have their own smell. Because of these disadvantages, they are being rapidly replaced by oxygen bleaching agents, which include, for example, sodium percarbonate and sodium perborate. Despite their high bleaching performance and stability, oxygen bleaching agents are less effective than chlorine bleaching agents and hence are used in combination with a bleach activating agent, which includes, for example, tetraacetylethylenediamine, acetoxybenzenesulfonate, tetraacetylglycolyluryl, and glucose pentaacetate. However, their bleach activating effect is not sufficiently high.

SUMMARY OF THE INVENTION

In their study to develop a new oxygen bleaching agent having a higher bleaching power, the present inventors found that this object is achieved with a compound which, upon reaction with hydrogen peroxide, forms an organic peracid precursor having a cationic group. (See Japanese Patent Laid-open No. 315666/198)

In their continued study, the present inventors found that it is possible to greatly improve not only bleaching power but also detergency by using an organic peracid precursor having a quaternary ammonium group and an alkyl group which are connected through a specific functional group such as ether, amide, and ester. This finding led to the present invention.

Accordingly, it is an object of the present invention to provide a bleaching agent and bleach-detergent composition which comprise containing therein:

(a) hydrogen peroxide or a peroxide which generates hydrogen peroxide in an aqueous solution, and (b) an organic peracid precursor represented by the general formula (I) below.

The bleaching composition of the invention comprises (a) hydrogen or a peroxide to produce hydrogen peroxide in its aqueous solution and (b) an organic peracid precursor having the below shown formula (I) in which a quaternary ammonium is connected with an alkyl through an ether, an amide, an ester or another.

It is preferable that the organic peracid precursor is selected from the group consisting of the below shown (a) to (h). A mole ratio of (a) to (b) preferably ranges from 99.9/0.1 to 20/80. The composition may further contain one or more selected from a surfactant, a divalent metal ion sequestering agent, an alkaline agent, an inorganic electrolyte, an anti-redeposition agent, an enzyme, a fluorescent whitening agent, a stabilizer for the peroxide, a perfume and a coloring agent.

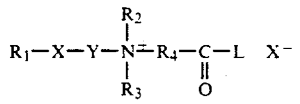

(I)

where $R_1$ denotes a straight-chain or branched-chain $C_1$–$C_{20}$ alkyl or alkenyl group which may have a substituent group, an unsubstituted or $C_1$–$C_{20}$ alkyl-substituted aryl group, or an alkoxylated hydrocarbyl group;

X denotes any one of

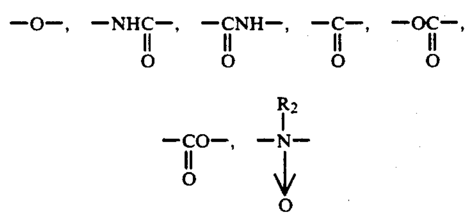

Y denotes any one of

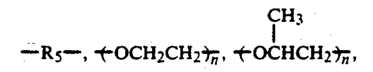

(where n is an integer of 1 to 10)

$R_2$ and $R_3$ each denotes a $C_1$–$C_3$ alkyl group which may have a substituent group, $R_4$ and $R_5$ each denotes a $C_1$–$C_{12}$ alkylene group which may have as substituent group, or any one of

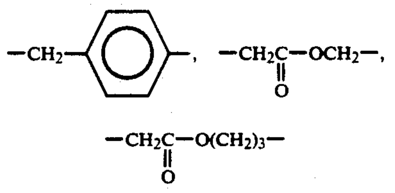

L denotes a leaving group represented by any one of

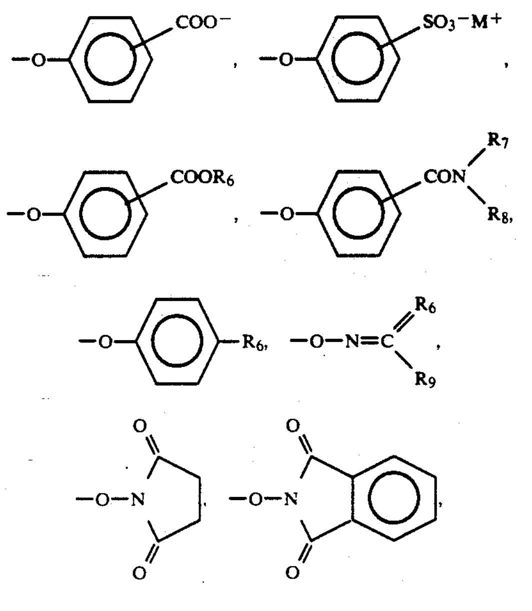

-continued

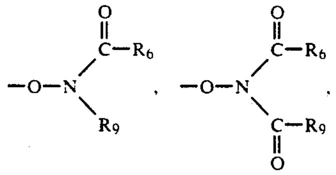

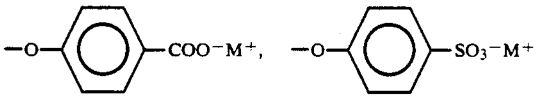

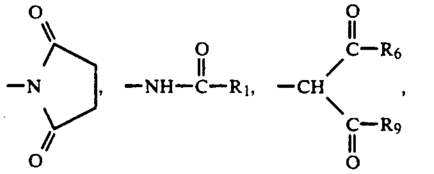

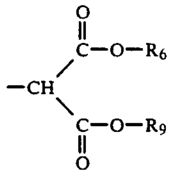

(where $R_6$ and $R_9$ each denotes an alkyl group, $R_7$ and $R_8$ each denotes hydrogen or an alkyl group, and $M^+$ denotes an alkali metal ion or hydrogen ion) or a glycerin residue or sugar residue, and $X^-$ denotes an inorganic or organic counter ion, provided that when L denotes

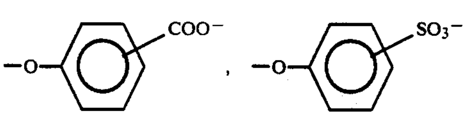

$X^-$ does not exist.

Preferred organic peracid precursors are those in which $R_1$ denotes a $C_{1-14}$ (particularly $C_{6-12}$) alkyl group, $R_2$ and $R_3$ each denotes a $C_{1-2}$ alkyl group, $R_4$ and $R_5$ each denotes a $C_1$- (particularly $C_{1-5}$) alkylene group, $R_6$ to $R_9$ each denotes a $C_{1-2}$ alkyl group, and n is an integer of 1 to 5. Examples of $X^-$ include a halogen ion, hydroxyl ion, metosulfate ion, ethyl sulfate ion, sulfate ion, and acetate ion.

Examples of the organic peracid precursor (b) suitable for use in the present invention include those which are represented by the formulas (a) to (h) below.

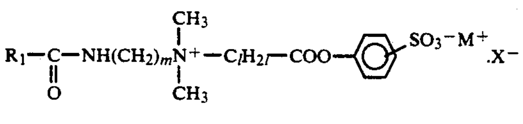

(a)

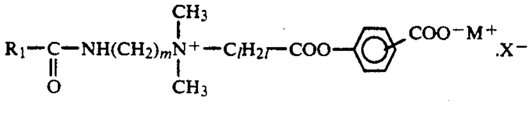

(b)

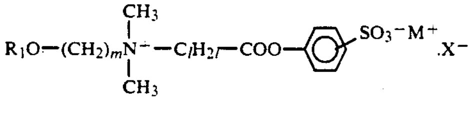

(c)

-continued

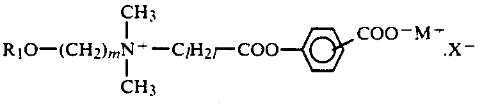

(d)

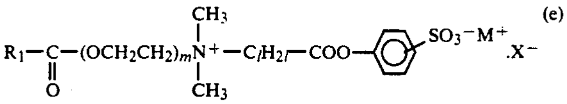

(e)

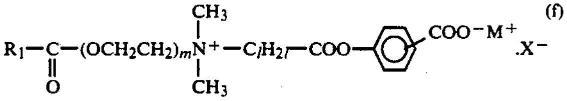

(f)

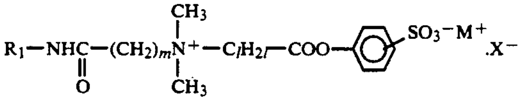

(g)

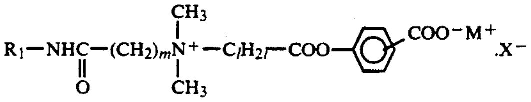

(h)

where $R_1$ is defined as above; m and l each denotes an integer of 1 to 10; and $M^+$ and $X^-$ may be absent in some cases.

The bleaching agent and bleach-detergent composition of the present invention contain a peroxide which generates hydrogen peroxide in an aqueous solution. Examples of the peroxide include sodium percarbonate, sodium tripolyphosphate-hydrogen peroxide adduct, sodium pyrophosphatehydrogen peroxide adduct, urea-hydrogen peroxide adduct, $4Na_2SO_4 \cdot 2H_2O_2 \cdot NaCl$, sodium perborate monohydrate, sodium perborate tetrahydrate, sodium peroxide, and calcium peroxide. Preferable among them are sodium percarbonate, sodium perborate monohydrate, and sodium perborate tetrahydrate.

According to the present invention, the bleaching agent and bleach-detergent composition should contain the peroxide (a) and the organic peracid precursor (b) in a molar ratio (a)/(b) of 99.9/0.1 to 20/80, preferably 99/1 to 50/50.

The bleaching agent and bleach-detergent composition of the present invention may contain, in addition to the essential ingredients, the following components which are commonly added to bleaching agents and bleach-detergent compositions.

[1] Surface active agents (1) Straight-chain or branched-chain alkylbenzene-sulfonate which contains an alkyl group having 10–16 carbon atoms on average.

(2) Alkyl or alkenyl ether sulfate to which is added 0.5–8 mol (on average in one molecule) of ethylene oxide, propylene oxide, butylene oxide, ethylene oxide-propylene oxide (0.1/9.9–9.9/0.1), or ethylene oxide-butylene oxide (0.1/9.9–9.9/0.1), with the alkyl or alkenyl group being a straight-chain or branched-chain one having 10–20 carbon atoms on average.

(3) Alkyl or alkenyl sulfate which contains an alkyl or alkenyl group having 10–20 carbon atoms on average.

(4) Olefin sulfonate which contains 10–20 carbon atoms (on average) in one molecule.

(5) Alkane sulfonate which contains 10–20 carbon atoms (on average) in one molecule.

(6) Saturated or unsaturated fatty acid salt which contains 10–24 carbon atoms (on average) in one molecule.

(7) Alkyl or alkenyl ether carboxylate to which is added 0.5–8 mol (on average in one molecule) of ethylene oxide, propylene oxide, butylene oxide, ethylene oxidepropylene oxide (0.1/9.9–9.9/0.1), or ethylene oxidebutylene oxide (0.1/9.9–9.9/0.1), with the alkyl or alkenyl group having 10–20 carbon atoms on average.

(8) A salt or ester of an α-sulfofatty acid represented by the formula below.

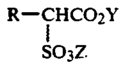

where Y denotes a $C_1$–$C_3$ alkyl group or counter ion, Z denotes a counter ion, and R denotes a $C_{10}$–$C_{20}$ alkyl or alkenyl group. The counter ion of anionic surface active agents is an alkali metal ion such as sodium and potassium.

(9) Polyoxyethylene alkyl or alkenyl ether to which is added 1–30 mol of ethylene oxide, with the alkyl or alkenyl group having 10–20 carbon atoms on average.

(10) Polyoxyethylene alkylphenyl ether to which is added 1–25 mol of ethylene oxide, with the alkyl group having 6–12 carbon atoms on average.

(11) Polyoxypropylene alkyl or alkenyl ether to which is added 1–20 mol of propylene oxide, with the alkyl or alkenyl group having 10–20 carbon atoms on average.

(12) Polyoxybutylene alkyl or alkenyl ether to which is added 1–20 mol of butylene oxide, with the alkyl or alkenyl group having 10–20 carbon atoms on average.

(13) Nonionic surface active agent to which is added 1–30 mol (in total) of ethylene oxide and propylene oxide, or ethylene oxide and butylene oxide (with the ratio of ethylene oxide to propylene oxide or butylene oxide being 0.1/9.9 to 9.9/0.1), with the alkyl or alkenyl group having 10–20 carbon atoms on average.

(14) Higher fatty acid alkanolamide or alkylene oxide adduct thereof represented by the following general formula.

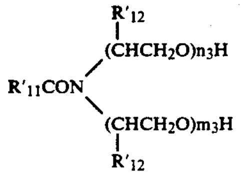

(where $R_{11}$ denotes a $C_{10\text{-}20}$ alkyl or alkenyl group, $R'_{12}$ denotes H or $CH_3$, $n_3$ denotes an integer of 1–3, and $m_3$ denotes an integer of 0–3.)

(15) Sugar fatty acid ester composed of a fatty acid (having 10–20 carbon atoms on average) and sucrose.

(16) Sugar fatty acid glycerin monoester composed of a fatty acid (having 10–20 carbon atoms on average) and glycerin.

(17) Alkylamine oxide represented by the general formula below.

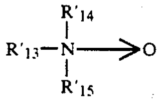

(where $R'_{13}$ denotes a $C_{10\text{-}20}$ alkyl or alkenyl group, and $R'_{14}$ and $R'_{15}$ each denotes a $C_{1\text{-}3}$ alkyl group.)

(18) Nonionic surface active agent available under a trade name of "Pluronic", which is obtained by the condensation of ethylene oxide.

(19) Cationic surface active agent represented by the general formula below.

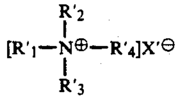

(where at least one of $R'_1$, $R'_2$, $R'_3$, and $R'_4$ is a $C_{8\text{-}24}$ alkyl or alkenyl group, with the remainder being $C_{1\text{-}5}$ alkyl groups, and X' denotes a halogen or metosulfate.)

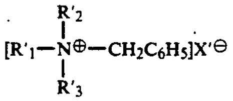

(where $R'_1$, $R'_2$, $R'_3$, and X' are defined as above.)

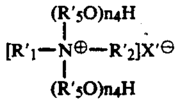

(where $R'_1$, $R'_2$, and X' are defined as above, $R'_5$ denotes a $C_{2\text{-}3}$ alkylene group, and $n_4$ denotes an integer of 1–20.)

[2] Divalent metal ion sequestering agent (or builder)

One or more than one kind selected from the following alkali metal salts and alkanolamine salts, in an amount of 0–50 wt.%.

(1) Phosphates such as orthophosphate, pyrophosphate, tripolyphosphate, metaphosphate, hexametaphosphate, and salts of phytic acid.

2) Salts of phosphonic acid such as ethane-1,2-diphosphoric acid, ethane-1,1,2-triphosphonic acid, ethane-1-hydroxy-1,1-diphosphonic acid (and derivatives thereof), ethanehydroxy-1,1,2-triphosphonic acid, ethane-1,2-dicarboxy-1,2-diphosphonic acid, and methanehydroxyphosphonic acid.

(3) Salts of phosphonocarboxylic acid such as 2-phosphonobutane-1,2-dicarboxylic acid, 1-phosphonobutane-2,3,4-tricarboxylic acid, and α-methylphosphonosuccinic acid.

(4) Salts of an amino acid such as aspartic acid, glutamic acid, and glycine.

(5) Salts of aminopolyacetic acid such as nitrilotriacetate, iminodiacetate, ethylenediaminetetraacetate, diethylenetriaminepentaacetate, glycoletherdiaminetetraacetate, hydroxyethyliminodiacetate, triethylenetetraminehexaacetate, and djenkolate.

(6) Polymeric electrolytes such as polyacrylic acid, polyfumaric acid, polymaleic acid, poly-α-hydroxyacrylic acid, polyacetalcarboxylic acid, and salts thereof.

(7) Alkali metal salts of organic acids such as diglycolic acid, oxydisuccinic acid, carboxymethyloxysuccinic acid, citric acid, lactic acid, tartaric acid, oxalic acid, malic acid, oxydisuccinic acid, gluconic acid, carboxymethylsuccinic acid, and carboxymethyltartaric acid.

(8) aluminosilicate represented by zeolite A.

[3] Alkaline agents or inorganic electrolytes

Silicates, carbonates, and sulfates. (Alkali metal salts are preferable.)

[4] Anti-redeposition agent

Polyethylene glycol, polyvinyl alcohol, polyvinyl pyrrolidone, and carboxy methyl cellulose.

[5] Enzymes

Protease, lipase, amylase, and cellulase.

[6] Fluorescent whitening agent 4,4,-bis-(2-sulfostyryl)-biphenyl salt, 4,4,-bis(4-chloro-3-sulfostyryl)-biphenyl salt, 2-(stilphenyl)naphthothiazole derivative, 4,4,-bis(triazol-2-yl)stilbene derivative, and bis(triazinylamino)stilbene disulfonic acid derivative.

[7] Stabilizer for peroxide

Magnesium salts (such as magnesium sulfate, magnesium silicate, magnesium chloride, magnesium silicofluoride, magnesium oxide, and magnesium hydroxide), and silicates (such as sodium silicate).

[8] Perfume and coloring agent

Effect of the invention

The bleaching agent and detergent of the present invention produces not only an outstanding bleaching effect but also an outstanding cleaning effect for sebaceous dirt and mud dirt.

The bleaching agent and bleach-detergent composition of the present invention contain a biodegradable bleach activating agent which is highly safe for the human body.

EXAMPLES

The invention will be described in more detail with reference to the following examples, which are not intended to restrict the scope of the invention.

Preparation of organic peracid precursor

Referential Example 1

Synthesis of an organic peracid precursor (I-a) represented by the formula below.

(I-a)

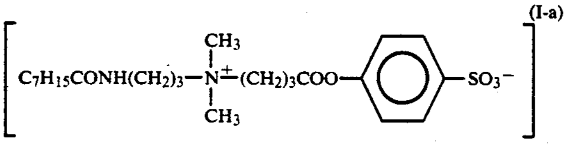

(1) In 300 g of dimethylformaldehyde (DMF) was dispersed 100 g (0.46 mol) of sodium p-phenolsulfonate which had previously been dehydrated. To the dispersion was added dropwise 64.6 g (0.46 mol) of 4-chlorobutyric acid chloride at 50° C. over 30 minutes, while stirring with a mechanical stirrer. Reaction was continued for 3 hours. DMF was distilled away under reduced pressure (0.5–1 mmHg) at 100° C., The residue was washed with acetone. Thus there was obtained 153.5 g (80.8% purity) of an ester compound (II) represented by the formula below. (Yield: 90%)

(II)

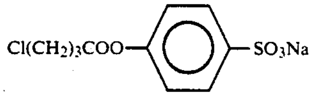

(2) A mixture consisting of 50 g (0.49 mol) of N,N-dimethylpropylenediamine and 64.1 g (0.44 mol) of n-caprylic acid was heated from 100° C. to 160° C. over 11 hours during which reaction was carried out while removing water evolved under a nitrogen stream. The reaction product was distilled at 120°–140° C. under a reduced pressure of 0.45 mmHg. Thus there was obtained 95.8 g (95% purity) of a clear liquid amine compound (III) represented by the formula below. (Yield: 92.2%)

(III)

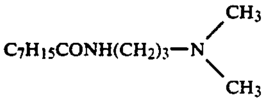

(3) In 150 g of DMF were suspended 50 g (0.21 mol, 95% purity) of the amine compound (III) and 61.7 g (0.2 mol, 80.8% purity) of the ester compound (II). They were reacted at 120° C. for 12–14 hours. The reaction product was filtered off, and the filtrate was distilled at 100° C. under a reduced pressure of 0.5–1 mmHg to remove the solvent. The residue was washed with acetone. Thus there was obtained 87.0 g (90% purity) of the organic peracid precursor (I-a), in the form of white powder, represented by the formula below. (Yield: 80%)

(I-a)

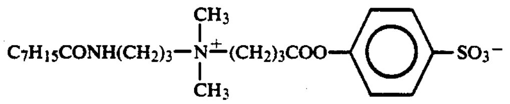

REFERENTIAL EXAMPLE 2

Synthesis of an organic peracid precursor (I-b) represented by the formula below.

(I-b)

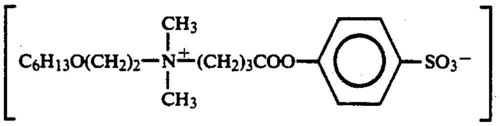

(1) A mixture consisting of 150 g (1.68 mol) of N,N-dimethylmonoethanolamine and 31.5 g (0.56 mol) of potassium hydroxide was heated at 105°–130° C. for reaction for 3 hours, while removing water evolved under a nitrogen stream. To the reaction mixture was added dropwise 67.7 g (0.56 mol) of 1-chlorohexane at 60°–70° C. over 1 hour, followed by reaction for 3 hours. The reaction mixture was filtered off to remove salts and the filtrate was distilled at 70°–75° C. under a reduced pressure of 1 mmHg. Thus there was obtained 45.6 g (96% purity) of a clear liquid amine compound (IV) represented by the formula below. (Yield: 45%)

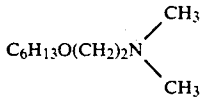
(IV)

(2) The ester compound (II) obtained in Referential Example 1 was reacted with the amine compound (IV) just mentioned above in the same manner as in Referential Example 1. Thus there was obtained the organic peracid precursor (I-b) represented by the formula below. (Yield: 75%)

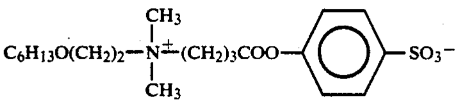
(I-b)

REFERENTIAL EXAMPLE 3

Synthesis of an organic peracid precursor (I-c) represented by the formula below.

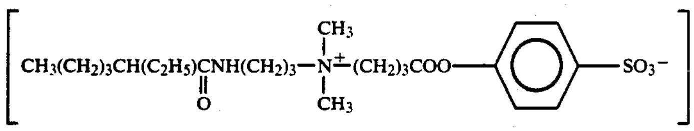

(1) In 150 ml of acetone was dissolved 50 g (0.49 mol) of N,N-dimethylpropylenediamine. To the solution (cooled in a water bath) was added dropwise 79.6 g (0.49 mol) of 2-ethylhexanoic acid chloride over 1 hour, followed by reaction for 3 hours. The reaction mixture was neutralized with 94.4 g of 28% sodium methoxide, followed by filtration to remove salts. The filtrate was freed of acetone and methanol by distillation. The residue was distilled at 145°-150° C. under a reduced pressure of 10.5 mmHg. Thus there was obtained 91.3 g (93% purity) of a clear liquid amine compound (V) represented by the formula below. (Yield: 76%)

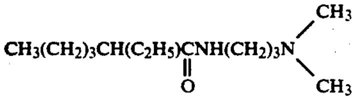
(V)

(2) The ester compound (II) obtained in Referential Example 1 was reacted with the amine compound (V) just mentioned above in the same manner as in Referential Example 1. Thus there was obtained the organic peracid precursor (I-c) represented by the formula below. (Yield: 76%)

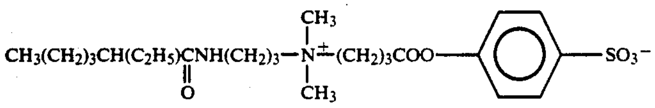
(I-c)

EXAMPLE 1

Bleaching agent compositions pertaining to the present invention were prepared according to the formulation shown in Table 1. Each composition contains any one of the activating agents I-a, I-b, and I-c prepared in Referential Examples and the activating agents represented by the formulas below. For comparison, bleaching agent compositions containing no activating agents were also prepared. They were examined for the bleaching effect.

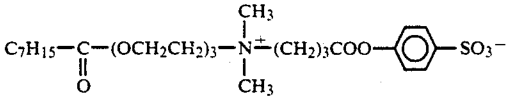
I-d

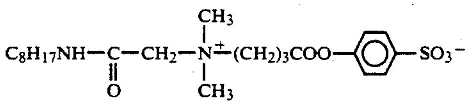
I-e

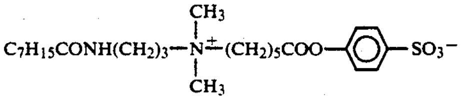
I-f

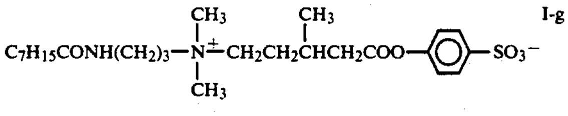
I-g

Measurement of bleaching effect

In 300 ml of water (20° C.) were dissolved sodium percarbonate (in an amount sufficient to give 0.05% of effective oxygen) and an activating agent (I-a to 1-g) or tetraacetylethylenediamine (TAED) for comparison (in an amount of 1/16 equivalent of hydrogen peroxide in the solution). The ratio of the two components is shown in Table 1.

In the thus prepared solution were soaked five pieces of cloth stained with black tea for 30 minutes. After bleaching, they were rinsed and dried, and the bleaching ratio was calculated according to the following formula.

$$\text{Bleaching ratio (\%)} = \frac{A - B}{C - B} \times 100$$

where
A: reflectance of stained cloth after bleaching
B: reflectance of stained cloth before bleaching
C: reflectance of unstained cloth
Reflectance was measured by means of NDR 1001DP (with a 460 nm filter) made by Nippon Denshoku Kogyo Co., Ltd.

The cloth stained with black tea was prepared in the following manner. First, 80 g of black tea ("Nitto Kocha" yellow package) was steeped in 3 liters of boiling water (deionized) for about 15 minutes. Then, the percolate was filtered through a piece of desized bleached cotton cloth. In the filtrate was boiled a piece of cotton shirting #2003 for about 15 minutes, followed by standing for about 2 hours. The cloth was air-dried and rinsed repeatedly until the washings were clear. Finally, the cloth was dehydrated and pressed and cut into pieces, measuring 8 cm by 8 cm, for experiments.

The results of the bleaching test are shown in Table 1.

TABLE 1

| | Examples | | | | | | | Comparative Products | | | |
|---|---|---|---|---|---|---|---|---|---|---|---|
| Components (wt %) | 1 | 2 | 3 | 4 | 5 | 6 | 7 | 1 | 2 | 3 | 4 |
| Sodium percarbonate | 80 | 82 | 80 | 78 | 81 | 79 | 79 | 94 | 100 | 83 | 81 |
| I-a | 20 | | | | | | | | | | |
| I-b | | 18 | | | | | | | | | |
| I-c | | | 20 | | | | | | | | |
| I-d | | | | 22 | | | | | | | |
| I-e | | | | | 19 | | | | | | |
| I-f | | | | | | 21 | | | | | |
| I-g | | | | | | | 21 | | | | |
| TAED | | | | | | | | 6 | | 17*1 | 19*2 |
| Bleaching ratio (%) | 41.5 | 42.1 | 41.6 | 40.5 | 41.9 | 40.3 | 41.0 | 22.5 | 14.5 | 40.3 | 37.4 |

*1 TAED was replaced by a compound of the formula below.

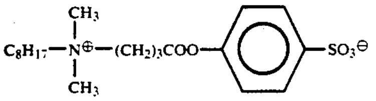

*2 TAED was replaced by a compound of the formula below.

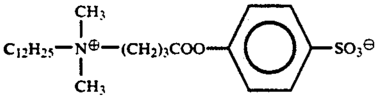

EXAMPLE 2

In a cleaning solution containing 0.0833% of commercial heavy-duty detergent and 0.0083% of sodium percarbonate was dissolved 0.0043% each of I-a and I-g and TAED.

The cleaning solution was used to wash five pieces of cloth (8 cm by 8 cm) stained with black tea (the same cloth as used in Example 1) in a terg-o-tometer (100 rpm) at 20° C. for 10 minutes. After rinsing and drying, the cloth was examined for bleaching ratio in the same manner as in Example 1.

The cleaning solution was also used in the same manner as above to wash five pieces of cloth soiled with mud dirt and five pieces of cloth soiled with sebaceous dirt. The washed cloth was tested for reflectance and the detergent efficiency was evaluated in the following manner.

Artificially soiled cloth (with mud)

A piece of shirting #2023 was dipped in 1000 ml of perchloroethylene containing dispersed therein 150 g of Kanuma red soil (for horticulture) which had been dried at 120°±5° C. for 4 hours, crushed, screened through a 150-mesh (100 $\mu$m) sieve, and dried again at 120±5° C. for 2 hours. After dipping, the shirting was brushed to remove excess soil. (See Japanese Patent Laid-open No. 26473/1980.)

Artificially soiled clott (with sebaceous dirt)

A piece of cotton cloth (10 cm by 10 cm) was uniformly smeared with 2 g of artificial sebaceous dirt of the following composition.

| | |
|---|---|
| Cotton seed oil | 60% |
| Cholesterol | 10% |
| Oleic acid | 10% |
| Palmitic acid | 10% |
| Liquid and solid paraffins | 10% |

Measurement of reflectance

Reflectance was measured by means of NDR 1001DP made by Nippon Denshoku Kogyo Co., Ltd. (with a 460 nm filter for cloth soiled with mud and a 550 nm filter for cloth soiled with sebaceous dirt).

The washing efficiency was calculated according to the following formula.

$$\text{Washing efficiency (\%)} = \frac{A - B}{C - B} \times 100$$

where

A: reflectance of soiled cloth after bleaching

B: reflectance of soiled cloth before bleaching

C: reflectance of unsoiled cloth

The results of the washing tests are shown in Table 2.

TABLE 2

| | Examples | | | | | | | Comparative Products | | | |
|---|---|---|---|---|---|---|---|---|---|---|---|
| Activating agent | I-a | I-b | I-c | I-d | I-e | I-f | I-g | TAED | 1*3 | 2*4 | 3*5 |
| Bleaching ratio (%) | 12.3 | 13.1 | 11.6 | 10.9 | 13.2 | 12.5 | 12.3 | 1.1 | 0.2 | 11.8 | 11.0 |
| Washing efficiency (%) | | | | | | | | | | | |
| Cloth soiled with sebaceous dirt | 75 | 74 | 74 | 76 | 75 | 74 | 75 | 68 | 70 | 69 | 67 |

TABLE 2-continued

| | Examples | | | | | | | Comparative Products | | | |
|---|---|---|---|---|---|---|---|---|---|---|---|
| Activating agent | I-a | I-b | I-c | I-d | I-e | I-f | I-g | TAED | 1*3 | 2*4 | 3*5 |
| Cloth soiled with mud | 70 | 69 | 71 | 70 | 69 | 71 | 71 | 62 | 63 | 63 | 63 |

*3 No activating agent was used.

*4 A compound of the formula below was used as the activating agent.

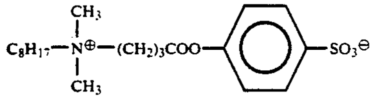

*5 A compound of the formula below was used as the activating agent.

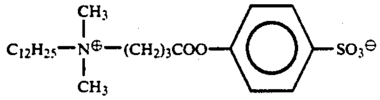

EXAMPLE 3

Bleach-detergent compositions of the present invention, each containing a different amount of phosphorus, were prepared according to the following formulations. They all exhibited good bleaching performance and detergency.

| | |
|---|---|
| (1) Phosphorus-free formulation | |
| Sodium linear dodecylbenzenesulfonate | 14 wt % |
| Polyoxyethylene alkyl ether ($C_{12}$-$C_{13}$, EO = 10 mol) | 6 wt % |
| Sodium salt of hardened tallow fatty acid | 2 wt % |
| Sodium silicate No. 2 | 5 wt % |
| Sodium carbonate | 10 wt % |
| Zeolite, type 4A | 25 wt % |
| Sodium sulfate | balance |
| Bleach activating agent (I-a) | 10 wt % |
| Polyethylene glycol (Mw = 6000) | 2 wt % |
| Protease | 2 wt % |
| Water | 4 wt % |
| (2) Low-phosphorus formulation | |
| Sodium linear dodecylbenzenesulfonate | 10 wt % |
| Sodium dodecyl sulfate | 2 wt % |
| Polyoxyethylene alkyl ether ($C_{12}$-$C_{13}$, EO = 7.7 mol) | 8 wt % |
| Sodium salt of hardened tallow fatty acid | 2 wt % |
| Sodium silicate No. 1 | 5 wt % |
| Sodium carbonate | 10 wt % |
| Zeolite, type 4A | 20 wt % |
| Sodium pyrosulfate | 15 wt % |
| Sodium sulfate | balance |
| Sodium perborate | 10 wt % |
| Bleach activating agent (I-b) | 5 wt % |
| Polyethylene glycol (Mw = 11000) | 1 wt % |
| Sodium sulfite | 1 wt % |
| Protease | 2 wt % |
| Water | 4 wt % |
| (3) High-phosphorus formulation | |
| Polyoxyethylene alkyl ether (R: tallow alcohol, EO = 8.6 mol) | 20 wt % |
| Sodium salt of hardened tallow fatty acid | 2 wt % |
| Sodium tripolyphosphate | 30 wt % |
| Sodium perborate | 10 wt % |
| Bleach activating agent (I-c) | 5 wt % |
| Sodium silicate No. 2 | 5 wt % |
| Sodium carbonate | 10 wt % |
| Sodium sulfite | 1 wt % |
| Polyethylene glycol (Mw = 6000) | 2 wt % |
| Protease | 2 wt % |
| Water | 6 wt % |
| Sodium sulfate | balance |

We claim:

1. A bleaching composition which comprises (a) a peroxygen compound capable of yielding hydrogen peroxide in an aqueous solution and (b) an organic peracid precursor having the formula (I):

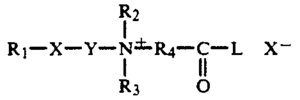

(I)

where $R_1$ is selected from the group consisting of a straight-chain or branched-chain $C_1$-$C_{20}$ alkyl or alkenyl group which may have a substituent group, an unsubstituted or $C_1$-$C_{20}$ alkyl-substituted aryl group, or an alkoxylated hydrocarbyl group;

X is selected from the group consisting of

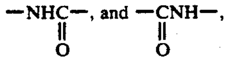

Y is selected from the group consisting of

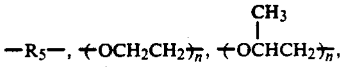

where n is an integer of 1 to 10

$R_2$ and $R_3$ each is selected from the group consisting of a $C_1$-$C_3$ alkyl group which may have a substituent group, $R_4$ and $R_5$ each is selected from the group consisting of a $C_1$-$C_{12}$ alkylene group which may have a substituent group, or any one of

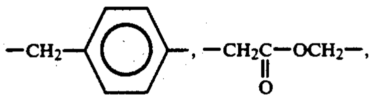

and

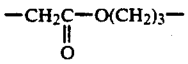

L is a leaving group selected from the group consisting of

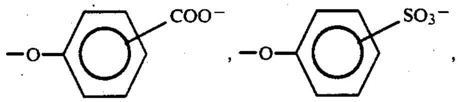

-continued

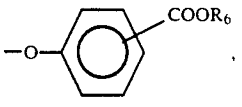, 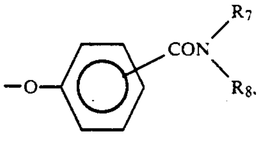,

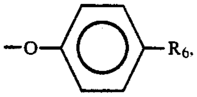, 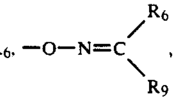,

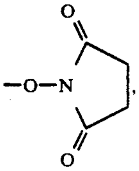, 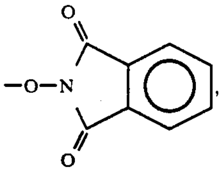,

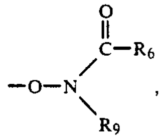, 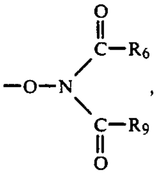,

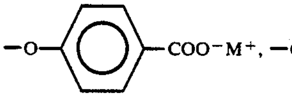, 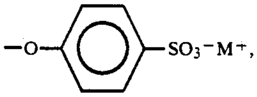,

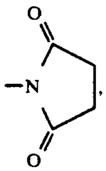, 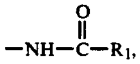,

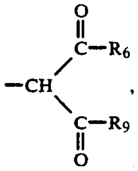, and 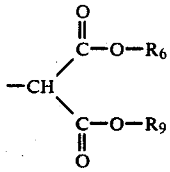

where $R_6$ and $R_9$ each is an alkyl group, $R_7$ and $R_8$ each is selected from the group consisting of hydrogen or an alkyl group, and $M^+$ denotes an alkali metal ion or hydrogen ion or a glycerin residue or sugar residue, and X is selected from the group consisting of an inorganic or organic counter ion, provided that when L is selected from the group consisting of

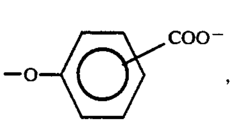, and 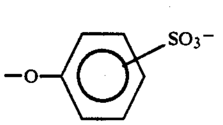

$X^-$ does not exist.

2. The composition claimed in claim 1, in which said organic peracid precursor is selected from the group consisting of the below shown (a) to (d).

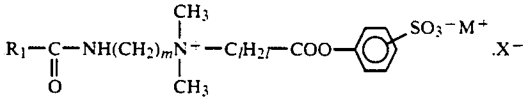 (a)

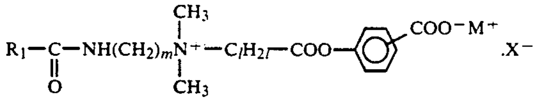 (b)

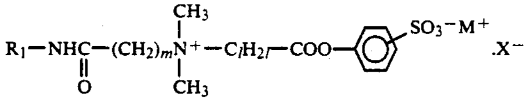 (c)

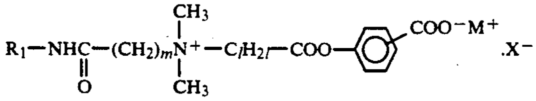 (d)

where $R_1$ is defined as above, m and l each denotes an integer of 1 to 10.

3. The composition as claimed in claim 1, in which a mole ratio of (a) to (b) ranges from 99.9/0.1 to 20/80.

4. The composition as claimed in claim 1, which further contains additional additives selected from the group consisting of a surfactant, a divalent metal ion sequestering agent, an alkaline agent, an inorganic electrolyte, an anti-redeposition agent, an enzyme, a fluorescent whitening agent, a stabilizer for the peroxide, a perfume and a coloring agent.

5. A bleaching composition which comprises (a) a peroxygen compound capable of yielding hydrogen peroxide in an aqueous solution and (b) an organic peracid precursor having the formula (I):

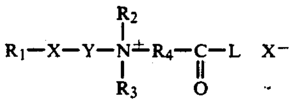 (I)

where $R_1$ is selected from the group consisting of a straight-chain or branched-chain $C_1$-$C_{20}$ alkyl or alkenyl group which may have a substituent group, an unsubstituted or $C_1$-$C_{20}$ alkyl-substituted aryl group, or an alkoxylated hydrocarbyl group;

X is

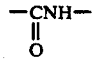

Y is selected from the group consisting of

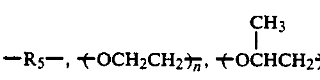

where n is an integer of 1 to 10

$R_2$ and $R_3$ each is selected from the group consisting of a $C_1$-$C_3$ alkyl group which may have a substituent group, $R_4$ and $R_5$ each is selected from the group consisting of a $C_1$-$C_{12}$ alkylene group which may have a substituent group, or any one of

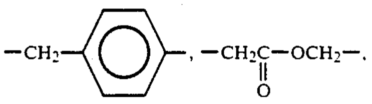

and

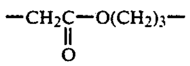

L is a leaving group selected from the group consisting of

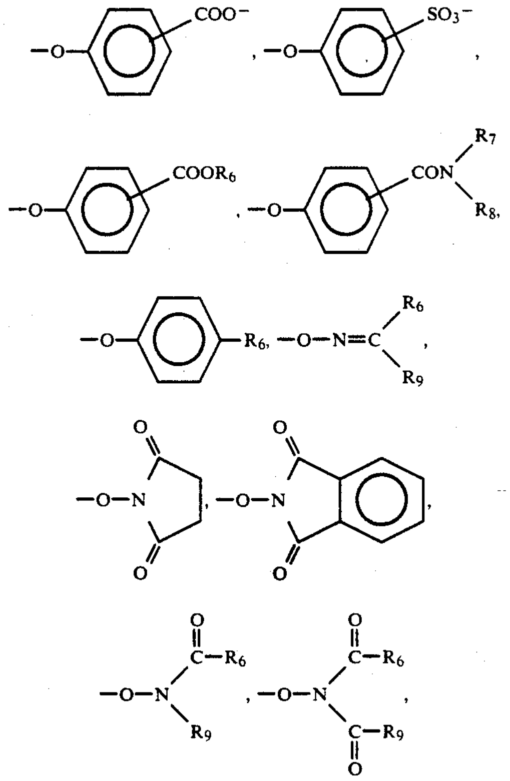

-continued

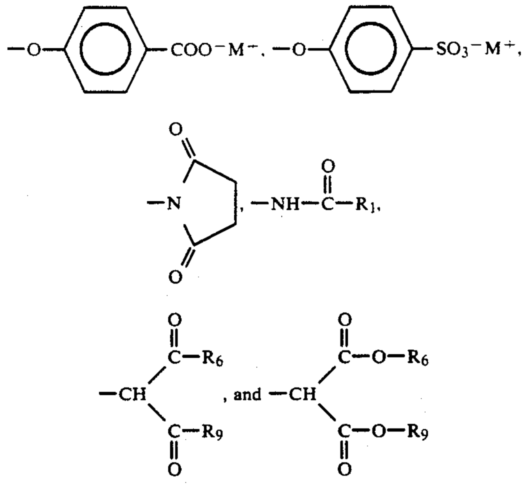

where $R_6$ and $R_9$ is an alkyl group, $R_7$ and $R_8$ each is selected from the group consisting of hydrogen or an alkyl group, and $M^+$ denotes an alkali metal ion or hydrogen ion or a glycerin residue or sugar residue, and X is selected from the group consisting of an inorganic or organic counter ion, provided that when L is selected from the group consisting of

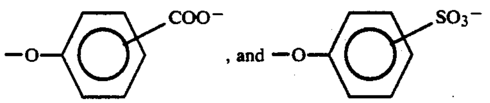

$X^-$ does not exist.

6. The composition as claimed in claim 5, in which a mole ratio of (a) to (b) ranges from 99.9/0.1 to 20/80.

7. The composition as claimed in claim 5, which further contains additional additives selected from the group consisting of a surfactant, a divalent metal ion sequestering agent, an alkaline agent, an inorganic electrolyte, an antiredeposition agent, an enzyme, a fluorescent whitening agent, a stabilizer for the peroxide, a perfume and a coloring agent.

* * * * *